United States Patent [19]
Pickles

[11] 3,845,669
[45] Nov. 5, 1974

[54] ROTARY TO LINEAR MOTION CONVERTER

[75] Inventor: Joseph Pickles, Birmingham, Mich.

[73] Assignee: Ferro Manufacturing Corporation, Detroit, Mich.

[22] Filed: Oct. 3, 1973

[21] Appl. No.: 403,215

[52] U.S. Cl. .................................. 74/422, 74/458
[51] Int. Cl. ...................... F16h 1/04, F16h 55/04
[58] Field of Search ................. 74/422, 424.7, 458

[56] References Cited
UNITED STATES PATENTS

| | | | |
|---|---|---|---|
| 1,983,962 | 12/1934 | Barber et al. | 74/458 X |
| 3,163,054 | 12/1964 | Werner | 74/458 X |
| 3,238,804 | 3/1966 | Goodykoontz | 74/458 X |

Primary Examiner—Leonard H. Gerin
Attorney, Agent, or Firm—Whittemore, Hulbert & Belknap

[57] ABSTRACT

A rotary to linear motion converter comprising a relatively stiff but bendable guide member in the form of a tube having a slit extending longitudinally at one side thereof. Within the guide member is a flexible rack preferably formed by winding a wire helically around a flexible core. A coupler is secured to the flexible rack and comprises a plate bent around the rack and extending at least partially into the spaces between adjacent convolutions of the helically wound wire. A pinion is mounted to mesh with the teeth formed by the helically wound element through the slit provided in the guide member. Surrounding the remainder of the flexible rack is a sleeve, preferably of a low friction plastic and of a thickness approximately equal to that of the plate forming the coupler.

10 Claims, 3 Drawing Figures

PATENTED NOV 5 1974 3,845,669

ROTARY TO LINEAR MOTION CONVERTER

BRIEF SUMMARY OF THE INVENTION

The construction is of a rotary to linear converter comprising an elongated substantially rigid but bendable guide member. The guide member may be bent to conform to a required path of movement and may thus include straight portions interconnected by arcuate portions. The guide member is of generally tubular configuration but is provided with an elongated slit at one side thereof through which a connection may be made to the interior of the guide member.

Within the guide member is a flexible rack formed of a relatively flexible core surrounded by a helically wound element usually in the form of a wire. The flexibility of the core is such that any substantial length thereof cannot be self-supporting under compression, and accordingly requires the cooperation of the guide member to guide the flexible rack longitudinally thereof.

A coupler is connected to a portion of the flexible rack and preferably takes the form of a metal plate which is pressed around the rack so that portions of the plate are bent in to occupy at least portions of the spaces between adjacent convolutions of the helically wound element. The edges of the plate are bent to provide ears which extend outwardly through the slit in the guide member and these ears are suitably apertured for connection to a device to be moved longitudinally along the guide member.

Inasmuch as portions of the coupler overlie portions of the helically wound element, the guide member has an internal diameter slightly greater than the external diameter of the helically wound element plus twice the thickness of the plate from which the coupler is formed. With this arrangement the coupler is freely movable longitudinally of the guide member but is supported against appreciable lateral movement.

Since the guide member must be of uniform internal dimensions throughout, the portions of the flexible rack which are not covered by the coupler have substantial clearance with respect to the internal surface of the guide member. This is undesirable since the flexibility of the rack is such that substantial lengths thereof under compressive forces will bend or bow and thus produce undesirable rubbing friction with respect to the guide member. This not only is undesirable from the standpoint of requiring excess power, but also produces undesirable wear and may be the source of undesirable noise.

In order to overcome these objections, the entire portion of the flexible rack which is not covered by the coupler is provided with a sleeve having a thickness substantially equal to that of the plate material from which the coupler is formed. Thus, the sleeve moves freely longitudinally of the guide member and prevents bowing or bending of the flexible rack within the guide member. Preferably, the sleeve is provided with longitudinally extending circumferentially spaced lips and these are shaped to extend outwardly through the slit provided in the guide member. The sleeve is preferably formed of a suitable low friction plastic material such for example as an acetal resin, for example, Delrin.

DETAILED DESCRIPTION

Figure 2:
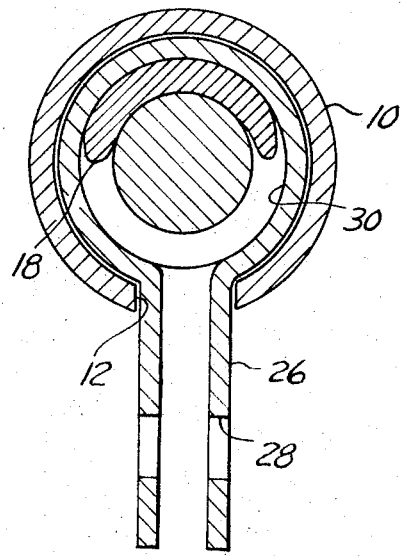
FIGS. 2 and 3 are sectional views on the lines 2—2, and 3—3, respectively, FIG. 1.
Figure 3:
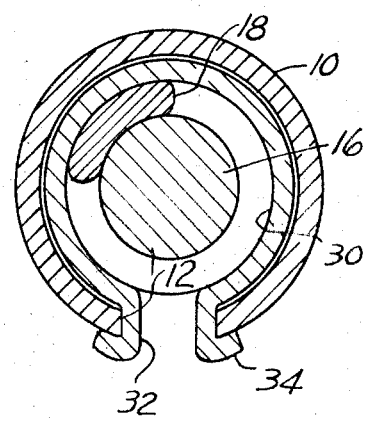

Referring now to the drawings, the motion converter comprises an elongated tube 10 preferably formed of metal and of generally cylindrical configuration as best seen in FIGS. 2 and 3, but provided with a longitudinally extending slit 12 at one side thereof. The tube 10 is dimensioned to have sufficient stiffness to form a guide for flexible structure therewithin but at the same time is bendable so that it may conform to a desired path of movement of a device to be connected to the motion converter.

Within the guide member is a flexible rack designated generally at 14 but comprising a generally cylindrical relatively flexible core 16 having an elongated element 18 wrapped helically around the core. The core 16 may be formed of a multiplicity of strands but since its specific construction forms no part of the present invention it is merely illustrated diagrammatically in the Figures. The element 18 may be in the form of a wire of circular cross-section tightly wrapped so as to grip the core 16 and to produce therewith a flexible elongated rack.

Cooperating with the flexible rack and extending through the slit 12 is a driving member in the form of a pinion 19 the teeth 20 of which are dimensioned to cooperate with the tooth portion of the wire 18.

Secured to a portion of the flexible rack 14 is a coupler 22 preferably formed from a metal plate and bent around the flexible rack in such a way that portions 24 thereof extend at least partly into the spaces between adjacent convolutions of the wire 18. The edges of the plate form arms 26 which extend through the slit 12 and these arms are apertured as indicated at 28 for connection to a device adapted to be moved by the motion converter.

Inasmuch as the coupler is required to move freely longitudinally of the guide member 10, but should be supported against appreciable lateral movement, the internal diameter of the tubular portion of the guide member 10 is dimensioned to slightly exceed the outside diameter defined by the convolutions of the wire 18 plus twice the thickness of the plate from which the coupler 22 is formed.

Figure 1:
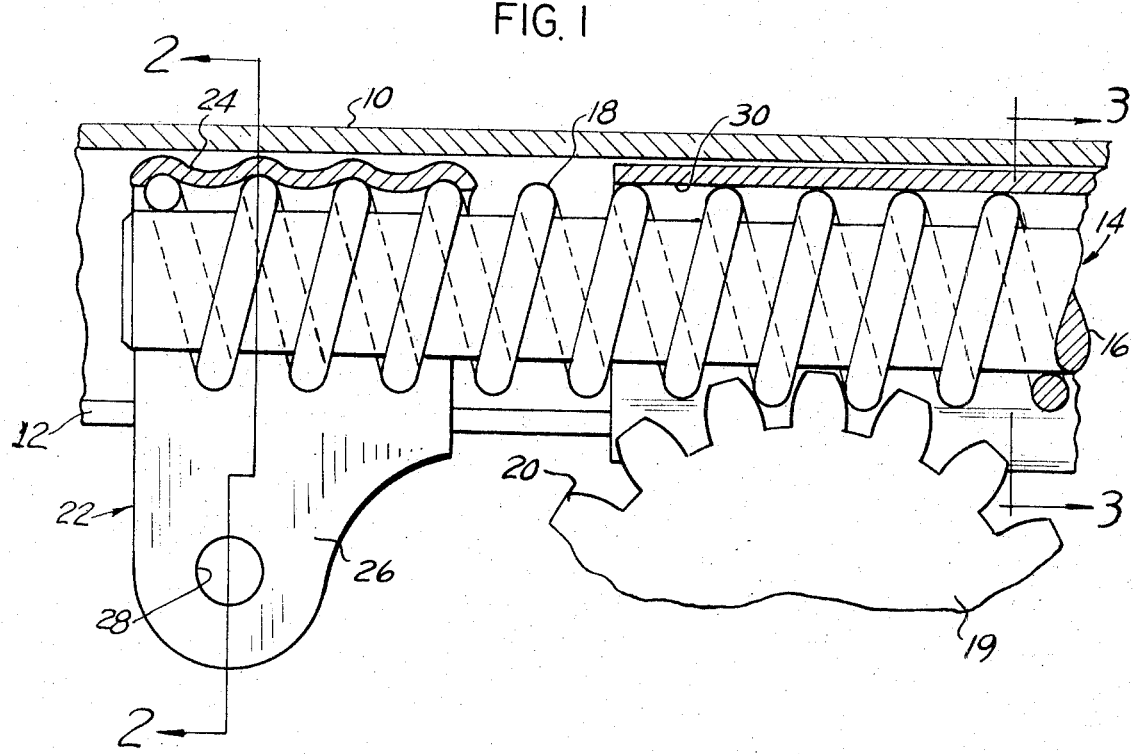
FIG. 1 is a fragmentary sectional view through a portion of the motion converter.

Rotation of the pinion 19 will apply forces tending to move flexible rack 14 longitudinally. Where these forces tend to move the flexible rack to the right as seen in FIG. 1 against a load imposed by a device connected to the coupler 22, the portion of the flexible rack intermediate the pinion 19 and the coupler 22 is in tension and no problems are presented. If however, the pinion 19 is rotated in counterclockwise direction, the forces imposed on the portion of the flexible rack intermediate the pinion 19 and the coupler 22 are in compression. Since the rack is quite flexible it tends to bend or bow within the tubular guide member 10 and this produces several undesirable results. In the first place, the bending produces friction resistance to movement of the flexible rack and thus requires additional power to move the device connected to the coupler. The same friction also produces undesirable wear of the parts. A possibly more serious disadvantage is the possible production of noise, a result which may be very much enhanced if the load is of quickly variable amounts. Finally, the shortening of the flexible rack due to its assuming a sinuous shape within the guide member may result in failure of the coupler to follow precisely the movements of the portion of the flexible rack in actual meshing engagement with the pinion.

All of these undesirable results are eliminated, and further improvement in operation follows the provision of a sleeve 30 which surrounds the flexible rack and more particularly surrounds and engages the outer surfaces of the convolutions of the helical elongated element or wire 18. Preferably, the sleeve 30 is of approximately the same thickness as the plate from which the coupler 22 is produced so that the sleeve also has a free sliding movement within the guide member but prevents lateral movement of any portion of the flexible rack within the guide member.

The sleeve 30, as best seen in FIG. 3, has laterally extending lips 32 which extend laterally through the slit 12 in the guide member. The outer edges of these lips are preferably turned over as indicated at 34 to engage the outer surface of the guide member.

The sleeve 30 is preferably formed of a suitable low friction plastic material which is flexible so as to conform to bends and curvatures within the guide member and to reduce sliding friction substantially of that which would be present if the outer surfaces of the wire 18 were in sliding friction with the internal surface of the guide member.

While the sleeve 30 is illustrated as merely engaged with the outer surface of the helical wire 18, it will of course be appreciated that it may be compressed thereabout in the same manner as the portions of the coupler 22 so as to have portions of the sleeve extend at least partially into spaces between adjacent convolutions of the wire 18.

What I claim as my invention is:

1. A rotary to linear motion converter comprising a relatively stiff but bendable elongated guide member of generally tubular configuration but having a narrow elongated slit extending longitudinally at one side thereof, a flexible generally cylindrical elongated core movable longitudinally within said guide member, said core having an elongated element helically wound on said core and forming a series of teeth along one side thereof and providing with said core a flexible rack constrained to move longitudinally within said guide member to follow bends and curvature thereof, a coupler comprising a plate shaped to extend around and attached to a portion of said flexible rack, and having a laterally extending arm movable longitudinally in and extending beyond said slit to connect to a device to be moved longitudinally of said guide member, said guide member having an internal diameter exceeding the external diameter of said helically wound elongated element by an amount slightly exceeding twice the thickness of said coupler to provide for free movement of said coupler longitudinally within said guide member, and a flexible sleeve surrounding the remainder of said flexible rack, said sleeve having a thickness approximately equal to that of the plate from which the coupler is formed so as to provide for free movement of the flexible rack and sleeve within said guide member and at the same time preventing bending or bowing of the flexible rack relative to said guide member.

2. A motion converter as defined in claim 1 in which the plate of which said coupler is formed is pressed firmly around the outside of said helically wound element and at least partly into the spaces between convolutions thereof.

3. A motion converter as defined in claim 1 in which said sleeve is formed of a low friction plastic material.

4. A motion converter as defined in claim 1 in which said sleeve has longitudinally extending circumferentially spaced lips which are spaced to expose the flexible rack therebetween for engagement by a driving pinion in mesh with the flexible rack.

5. A motion converter as defined in claim 3 in which said sleeve has longitudinally extending circumferentially spaced lips which are spaced to expose the flexible rack therebetween for engagement by a driving pinion in mesh with the flexible rack.

6. A motion converter as defined in claim 3 in which said lips extend laterally from said flexible rack through the slit in said guide member.

7. A motion converter as defined in claim 6 in which the edges of the laterally extending lip portions of said sleeve extend around the confronting edges of the slit in said guide member.

8. A motion converter as defined in claim 1 in which said helically wound element is a metal wire.

9. A motion converter as defined in claim 1 in which said coupler is formed from a metal plate.

10. A motion converter as defined in claim 1 in which said coupler is formed from a metal plate, the edge portions of which are bent to extend outwardly through said slit in spaced relation to define said arm, and to expose the flexible rack therebetween.

* * * * *